US008608063B2

(12) United States Patent
Butt et al.

(10) Patent No.: US 8,608,063 B2
(45) Date of Patent: Dec. 17, 2013

(54) SYSTEMS AND METHODS EMPLOYING INTERMITTENT SCANNING TECHNIQUES TO IDENTIFY SENSITIVE INFORMATION IN DATA

(75) Inventors: Alan B. Butt, Orem, UT (US); Nathan K. Stocks, Orem, UT (US)

(73) Assignee: SecurityMetrics, Inc., Orem, UT (US)

( * ) Notice: Subject to any disclaimer, the term of this patent is extended or adjusted under 35 U.S.C. 154(b) by 134 days.

(21) Appl. No.: 13/149,544

(22) Filed: May 31, 2011

(65) Prior Publication Data

US 2012/0023117 A1 Jan. 26, 2012

Related U.S. Application Data

(60) Provisional application No. 61/349,809, filed on May 28, 2010.

(51) Int. Cl.
*G06K 5/00* (2006.01)
*G06F 17/30* (2006.01)

(52) U.S. Cl.
USPC ........................................ 235/380; 707/805

(58) Field of Classification Search
USPC ............... 707/802–812; 235/380–382.5, 383; 705/39–42; 726/22–25
See application file for complete search history.

(56) References Cited

U.S. PATENT DOCUMENTS

| 7,328,430 | B2 | 2/2008 | Fairweather |
| 8,256,006 | B2 | 8/2012 | Grzymala-Busse et al. |
| 8,407,261 | B2 | 3/2013 | Koyanagi et al. |
| 2002/0112167 | A1 | 8/2002 | Boneh et al. |
| 2003/0140007 | A1* | 7/2003 | Kramer et al. .................. 705/40 |
| 2007/0276765 | A1* | 11/2007 | Hazel et al. ..................... 705/71 |
| 2008/0126301 | A1 | 5/2008 | Bank et al. |
| 2008/0216174 | A1 | 9/2008 | Vogel et al. |
| 2009/0282039 | A1 | 11/2009 | Diamond |
| 2009/0289112 | A1* | 11/2009 | Bonalle et al. ................ 235/380 |
| 2009/0310778 | A1* | 12/2009 | Mueller et al. .................. 380/44 |
| 2010/0012589 | A1 | 1/2010 | Ribault et al. |

OTHER PUBLICATIONS

International Search Report and Written Opinion of the International Searching for PCT application No. PCT/US2011/038632, mailed Sep. 29, 2011.
Ricardo A. Baeza-Yates et al., "Fast Text Searching for Regular Expressions or Automaton Searching on Tries," Journal of the ACM, vol. 43, No. 6, Nov. 1996, pp. 915-936.

* cited by examiner

*Primary Examiner* — Wilson Lee
(74) *Attorney, Agent, or Firm* — Durham Jones & Pinegar Intellectual Property Group (57) ABSTRACT

Potentially sensitive information (e.g., account numbers for payment cards, etc.) may be identified from data by use of an "interval scanning" technique, in which a string of data is evaluated in intervals. When a system employs an interval scanning technique, data is evaluated by analyzing bytes of data in periodic sequence (e.g., every thirteenth byte, etc.), while the bytes between the analyzed bytes are initially ignored. If the value of an analyzed byte corresponds to a character of interest (e.g., a decimal numeral or numeric digit (i.e., a character having a value that corresponds to a base-ten, or Arabic, number, 0, 1, 2, 3, 4, 5, 6, 7, 8, or 9), etc.), that byte is identified as a "base byte," from which a more focused evaluation (e.g., a byte-by-byte analysis, or sequential analysis, etc.) may then commence.

27 Claims, 5 Drawing Sheets

SYSTEMS AND METHODS EMPLOYING INTERMITTENT SCANNING TECHNIQUES TO IDENTIFY SENSITIVE INFORMATION IN DATA

CROSS REFERENCE TO RELATED APPLICATION

A claim for priority is made under 35 U.S.C. §119(e) to the May 28, 2010, filing date of U.S. Provisional Patent Application 61/349,809, titled "SYSTEMS FOR DETERMINING WHETHER BATCHES OF DATA INCLUDE STRINGS THAT CORRESPOND TO SENSITIVE INFORMATION," the entire disclosure of which is, by this reference, hereby incorporated herein.

TECHNICAL FIELD

The present invention relates generally to methods and systems for scanning systems that collect and disseminate sensitive information (e.g., merchants' systems that process transactions with payment cards, etc.) and, more specifically, to methods and systems for recognizing sensitive information (e.g., payment card account numbers, etc.) in large groups of data.

BACKGROUND OF RELATED ART

Credit card and debit card, or "payment card," processing involves a number of parties, including a card association, an issuer, a cardholder, an acquirer, and a merchant.

When a potential cardholder, such as an individual or an organization, wants a payment card, they approach an issuer. The issuer is a financial institution. If the potential cardholder meets certain requirements (e.g., credit rating, account balance, income, etc.), the issuer may choose to issue a payment card to the cardholder. The payment card contains sensitive information about the cardholder, including the cardholder's identity and account information, which enables the cardholder to transfer funds from an account held by the issuer or to draw against a corresponding line of credit provided by the issuer.

A cardholder makes a purchase, or initiates a transaction, with the payment card by presenting the same to a merchant. Information obtained from the payment card by the merchant is then processed. The information may be processed using equipment that may be provided by an acquirer, which is a financial institution with which the merchant has an established relationship. As the information is processed, it is transferred to a card association (e.g., VISA, MASTERCARD, etc.), either directly from the merchant or through the acquirer. The card association transmits the information about the transaction to the issuer. The issuer then authorizes or declines the transaction. If the transaction is authorized, the issuer funds the transaction by transferring money to the acquirer through the card association. When a debit card is used, funds are transferred from the cardholder's account with the issuer to the acquirer. When the cardholder uses a credit card, the cardholder incurs a debt with the issuer, for which the cardholder must eventually reimburse the issuer.

Whenever a cardholder uses a payment card to make a purchase, the merchant obtains information, including the account number, from the payment card. While that information may be obtained in a number of ways, the merchant typically uses some type of electronic processing equipment to transmit the information, by way of a communication element (e.g., an Internet connection, etc.) to its acquirer or a card association. Sometimes the information is stored in memory associated with the processing equipment. That information may be stored in groups that include long strings of data.

Since the processing equipment includes a communication element, any memory associated with the processing equipment may be subject to hacking. Thus, any information stored in memory associated with processing equipment may be subject to theft. When payment card information is stolen, that information may be used to make unauthorized purchases.

DISCLOSURE

The present invention includes methods and systems for identifying sensitive information (e.g., payment card information, etc.) in large groups of data that have been stored in memory associated with collection systems (e.g., equipment for processing payment card transactions, etc.).

In one aspect, a method of the present invention includes various embodiments of methods and systems for identifying potentially sensitive information (e.g., account numbers for payment cards, etc.). One embodiment of such a method includes an "interval scanning" technique, in which a string of data is evaluated in intervals. When such a method is used, data is evaluated by analyzing bytes of data in periodic sequence (e.g., every thirteenth byte for UTF-8 (8-bit Unicode Transformation Format) encoding, two sequential bytes of every twenty-six bytes for UTF-16 (16-bit Unicode Transformation Format) encoding, four sequential bytes of every fifty-two bytes for UTF-32 (32-bit Unicode Transformation Format) encoding, etc.), while the bytes between the analyzed bytes are initially ignored. Searching may be "ordinal" (e.g., one byte searching, then two byte searching (both little endian (LE) and big endian (BE)), then four byte searching (both LE and BE), etc.) to enable the search algorithm to identify data of interest across a plurality of, or regardless of the particular type of, format in which the data may be encoded (e.g., UTF-8, UTF-16LE, UTF-16BE, UTF-32LE, UTF-32BE). If the value of an analyzed byte or group bytes (two adjacent bytes in UTF-16 encoding, four adjacent bytes in UTF-32 encoding, etc., which groups are referred to herein as a "byte" for the sake of simplicity) corresponds to a character of interest (e.g., a decimal numeral or numeric digit (i.e., a character having a value that corresponds to a base-ten, or Arabic, number, 0, 1, 2, 3, 4, 5, 6, 7, 8, or 9), etc.), that byte is identified as a "base byte," from which a more focused evaluation (e.g., a byte-by-byte analysis, or sequential analysis, etc.) may then commence. In the sequential analysis, bytes adjacent to both "sides" of the base byte are analyzed to determine whether or not their values also correspond to characters of interest (e.g., decimal numerals). The sequential search may continue until a determination is made that the number of sequential bytes that correspond to characters of interest (e.g., decimal numerals, etc.) is too short (e.g., <13 digits, etc.) or too long (e.g., >16 digits, etc.) to comprise the sensitive information of interest (e.g., an account number for a payment card, etc.).

If the number of sequential bytes that correspond to characters of interest (e.g., decimal numerals, etc.) is too long or too short to comprise the sensitive information of interest (e.g., an account number for a payment card, etc.), the process may be repeated. In particular, interval searching may recommence from the base byte or from any other byte analyzed during the sequential search until another byte that corresponds to a character of interest (e.g., a decimal numeral, etc.)

is identified. At that point, identification of one or more additional base bytes and further sequential searching may be repeated.

If, in the alternative, the length or number of sequential bytes that represent characters of interest (e.g., decimal numerals, etc.) corresponds to the length of or number of characters in potentially sensitive information (e.g., a possible account number for a payment card, etc.), the sequence may be identified as a "tagged string," which includes potentially sensitive information. Further analysis of the tagged string of data may ensue, either immediately or after an entire group of data has been analyzed (by more interval searching, tagging, and sequential searching) for more potential sensitive information.

Once potentially sensitive information (e.g., an account number for a payment card, etc.) has been identified, the potentially sensitive information may be subjected to further evaluation to determine, with an increased likelihood, whether or not the potentially sensitive information is likely to actually comprise sensitive information. In one embodiment, such further evaluation may include a delimiter search, in which the bytes adjacent to the beginning and end of the string of bytes that correspond to a tagged string of data are evaluated to determine whether a known delimiter character has been used to set a string of bytes that may corresponding to sensitive information apart from adjacent data. In another embodiment, potentially sensitive information may be evaluated to determine whether or not it includes a known identifier that typically accompanies a particular type of sensitive information (e.g., a bank identification number (BIN) of a payment card account number, etc). A search for a known identifier may be effected using a so-called "trie" algorithm. Ordinal searching may be used to determine whether known delimiters have been used to set a tagged string of data apart from other data and/or to determine whether a tagged string of data includes a known identifier.

One or more of the evaluation processes of the present invention may be used to provide an increased level of confidence that the bytes of a particular data string correspond to characters of potentially sensitive information of interest. Any tagged strings that are unlikely to include the potentially sensitive information of interest may be disregarded. In some embodiments, the further evaluation comprises a much less intensive process and, thus, less time to complete, than a final process for verifying whether a data string actually includes sensitive information of interest. Thus, quicker processes may be used to disregard, or weed out, the majority of data within a group, while the more intensive final process may be reserved for data strings that are likely to include the sensitive information of interest.

In some embodiments, known processes may be used to verify that a tagged string includes sensitive information (e.g., an account number for a payment card, etc.). In a specific embodiment, a known validation or "checksum" algorithm, such as the Luhn algorithm, may be used to determine whether or not a tagged string encodes an actual payment card account number.

A system of the present invention may execute one or more of the processes that have been described above. The above-described processes may be implemented in the form of a program that may be executed by processing element (e.g., computer processor, etc.) or that evaluates, or scans, stored data. The data may be stored in memory associated with the processing element, in memory of a separate electronic device. The processing element may access the stored data by way of a suitable communication element, such as circuitry and/or wiring within the same electronic device (e.g., computer, etc.) as the processing element, a wired communication link between the electronic device of which the processing element is a part and a separate electronic device of which the memory is a part, or remotely (e.g., over an Internet connection, etc.).

Other aspects, as well as features and advantages of various aspects, of the present invention will become apparent to those of ordinary skill in the art through consideration of the ensuing description, the accompanying drawings, and the appended claims.

DETAILED DESCRIPTION

Figure 1:
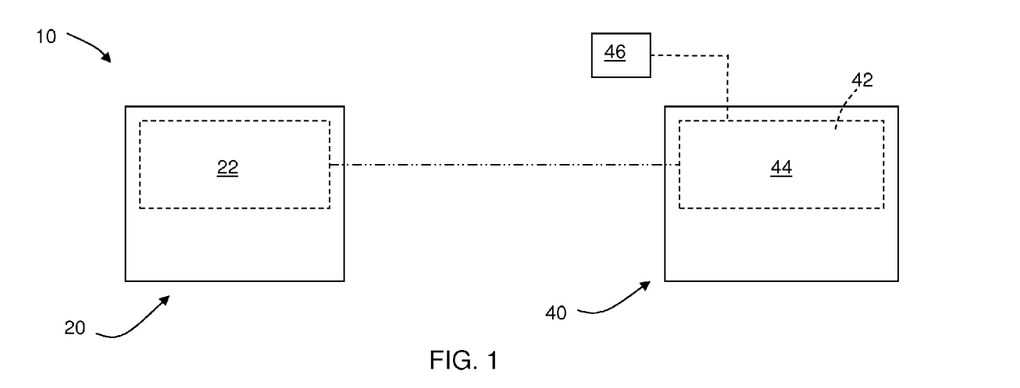
FIG. 1 is a schematic representation of an embodiment of an evaluation system of the present invention, which includes a collection system and a scanning device for evaluating the collection system.

The present invention includes various embodiments of systems for evaluating data to determine whether or not the data includes potentially sensitive information. FIG. 1 schematically depicts an embodiment of such an evaluation system 10, in which an electronic device, referred to here is a "scanning device 20," is configured to communicate with and scan data stored by a component of another electronic device that collects sensitive information, which is referred to herein as a "collection system 40."

The collection system 40 includes a memory device (e.g., a hard drive, etc.), or "memory 42" for the sake of simplicity, that stores data 44, which potentially includes sensitive information. In addition to memory 42, a collection system 40 of an evaluation system 10 of the present invention may include or be associated with a processing element 46, such as a microprocessor, a microcontroller, or the like.

The scanning device 20 is programmed to determine whether the data 44 stored by the memory 42 of the collection system 40 includes any potentially sensitive information. Programming of the scanning device 20, which may be in the form of software or firmware, controls operation of a processing element 22 of the scanning device 20. Some embodiments of processing elements 22 that may be included in a scanning device 20 of an evaluation system 10 of the present invention include, without limitation, microprocessors, microcontrollers, and elements that may be configured to execute a particular program. In embodiments where a scanning device 20 of an evaluation system 10 of the present invention is configured for direct connection to a collection system 40, the scanning device 20 may be portable (e.g., a laptop computer; a hand-held computer, such as a so-called "smart phone," etc.; a dedicated scanner; etc.). In embodiments where a scanning device 20 is configured to remotely scan one or more collection systems 40, the scanning device 20 may comprise a server, or a device (e.g., a dedicated scanning device, a smart phone, etc.) that may connect remotely to the collection system 40 (e.g., through a cellular telephone data connection, etc.).

Communication between the memory 42 of the collection system 40 and a processing element 22 of the scanning device 20 may be established in any suitable manner known in the art. In embodiments where both the scanning device 20 and the collection system 40 comprise electronic devices, a communication link between the scanning device 20 and the collection system 40 may be direct or indirect. A direct connection may include a physical, or "wired," coupling between the scanning device 20 and the collection system 90, or it may include a close proximity wireless connection (e.g., a Bluetooth connection, a wireless local area network (WLAN) (e.g., a WiFi network operating in accordance with an IEEE 802.11 standard, etc.). An indirect connection may be established more remotely (e.g., over the Internet, etc.)). In some embodiments where an indirect connection is established between the scanning device 20 and the collection system 40, the scanning device 20 of an evaluation system 10 that incorporates teachings of the present invention may be located at a central location, and may be configured to selectively communicate with a plurality of different collection systems 40 at a plurality of different locations.

An evaluation system 10 may be used in a variety of contexts or environments where sensitive information (e.g., account numbers, usernames and associated passwords, Social Security numbers or similar identifiers, etc.) is used. In a specific embodiment, the evaluation system 10 is configured to scan for and identify potential credit card numbers and debit card numbers, which are collectively referred to herein as "payment card numbers." The scanning device 20 in such an embodiment may comprise a server under control of an approved scanning vendor (ASV), which is a party that has been authorized to access and evaluate the systems (i.e., the collection systems 40, such as card readers, associated computers, etc.) employed by one or more merchants to acquire information from a consumer's payment card.

Figure 2:
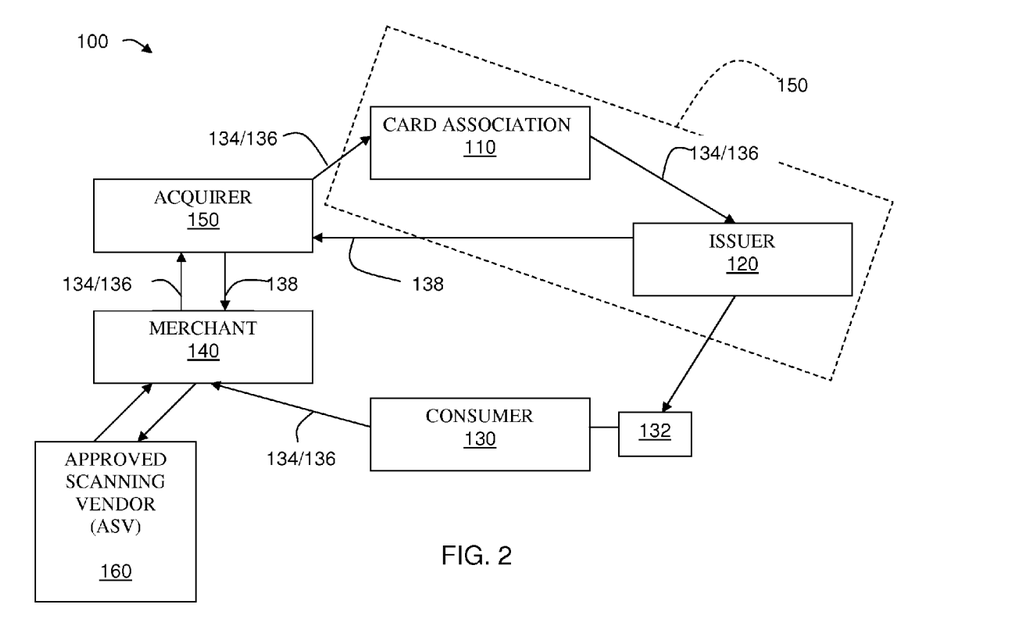
FIG. 2 is a diagram that illustrates an embodiment of a network in which sensitive information, such as account information corresponding to payment cards, may be collected and disseminated, and in which searches for sensitive information may be conducted.

The relationships between the various parties that may be involved in payment card transactions are illustrated by the schematic representation of FIG. 2. More specifically, FIG. 2 depicts a network 100 that includes a card association 110; an issuer 120; a cardholder, or consumer 130; a merchant 140; and an acquirer 150.

The card association 110 is generally recognized as the entity whose identity appears most prominently on a payment card 132. Examples of card associations 110 include, but are certainly not limited to, Visa, Master Card, American Express, and Discover. As depicted, the card association 110 may act as a gateway between an issuer 120 and an acquirer 150, enabling the authorization and funding of a consumer 130's transactions. In some embodiments, a card association 110 (e.g., American Express, Discover, etc.) may also serve as the issuer 120, as depicted by box 150 in FIG. 2.

The issuer 120 may be a financial institution. As FIG. 2 schematically represents, there is a direct relationship between the issuer 120 and each of its consumers 130: the issuer 120 provides each of its consumers 130 with a payment card 132. In so doing, the issuer 120 may determine whether or not each of its consumers 130 meets certain qualifications, such as credit history, income or revenue, available funds, employment status, and other indicators of the ability of a particular consumer 130 to pay for transactions that will be enabled by use of the payment card 132.

The consumer 130 may be an individual, a business, or any other entity. Each consumer 130 should assume responsibility for its payment card 132, as well as the information on or otherwise associated with the payment card 132.

Each merchant 140 is a party that provides goods or services to a variety of consumers 130. In the network 100, a merchant 140 provides consumers 130 with the option to use payment cards 132 to complete transactions for the merchant 140's goods or services. When a consumer 130 chooses to use a payment card 132 to complete a transaction, the merchant 140 uses a collection system 40 (FIG. 1) to obtain account information 134 (e.g., an account number, an expiration date, information about the consumer 130's identity, etc.) from the payment card 132. That account information 134 is then transmitted, along with information about the transaction, or "transaction information 136," by the collection system 40 to the card association 110. The transaction information 136 may include data indicative of the point of sale, the date and time of the transaction, goods or services purchased as part of the transaction, the monetary amount of the transaction, and the like.

The account information 134 and the corresponding transaction information 136 may be transmitted to the card association 110 either directly or through the acquirer 150, which is a financial institution (e.g., a bank, etc.) with which the merchant 140 has an established relationship.

The card association 110 then transmits the account information 134 and the corresponding transaction information 136 to the issuer 120, which authorizes or declines the transaction. If the transaction is authorized, the issuer 120 funds the transaction. Where an acquirer 150 is involved, the issuer 120 transfers money 138 to the acquirer 150 through the card association 110. When the payment card 132 is a debit card, funds are transferred from the cardholder's account with the issuer 120 to the acquirer 150. When the consumer 130 uses a credit card, the consumer 130 incurs a debt with the issuer 120, for which the consumer 130 must eventually reimburse the issuer 120.

The Payment Card Industry (PCI), an organization that governs the network 100, sets standards for the collection, storage, and transmission of account information 134 within the network 100. These standards are known as PCI's Data Security Standards (DSS). In view of the ever-increasing danger that sensitive account information 134 will be stolen, the PCI often modifies, typically increasing, the DSS.

Each merchant 140 within the network 100 (i.e., each merchant 140 that accepts payment cards 132 from its consumers 130) must comply with the current version of the DSS or risk fines from PCI. In addition, a merchant 140 that does not comply with the current DSS may be liable to its consumers 130 for the misappropriation of their sensitive account information 134.

In order to ensure that the merchants 140 within the network 100 comply with the current DSS, the network 100 may also include one or more approved scanning vendors 160 (ASVs). An ASV 160 is an entity that has been certified by PCI to evaluate the systems (e.g., collection systems 40-FIG.

1) that are used within the network 100 to collect and transmit account information 134, and to determine whether or not those systems are DSS compliant. Each ASV 160 may be employed by one or more merchants 140, by one or more acquirers 150, or by a card association 110.

With returned reference to FIG. 1, an ASV 160 (FIG. 2) may use a scanning device 20 to verify whether or not a merchant's collection systems 40 are DSS compliant. Communication may be established between the processing element 22 of the scanning device 20 and various components of a merchant 140's (FIG. 2) collection system 40, including, but not limited to, its memory 42. Communication between the processing element 22 and the collection system 40 may be direct or remote, and may be established by any suitable technique or protocol.

In determining whether or not a merchant's collection system 40 is DSS compliant, the processing element 22 of the ASV 160's (FIG. 2) scanning device 20 operates under control of one or more programs (e.g., computer programs, etc.) to evaluate certain aspects of the collection system 40. Various embodiments of programs that control operation of the processing element 22, as well as the processes that are effected by such programs in accordance with teachings of the present invention, are described hereinafter.

In a specific embodiment, a process or program of the present invention may cause the processing element 22 of a scanning device 20 to evaluate data 44 stored by one or more components (e.g., memory 42, etc.) of a merchant 140's (FIG. 2) collection system 40 to determine whether the data 44 includes account information 134 that corresponds to one or more payment cards 132 (FIG. 2). More specifically, a program of the present invention may be configured to effect a process in which data 44 is evaluated to determine whether it includes any data strings that are likely to comprise payment card account numbers. Such a process 200 is illustrated by the diagram of FIG. 3.

Figure 3:
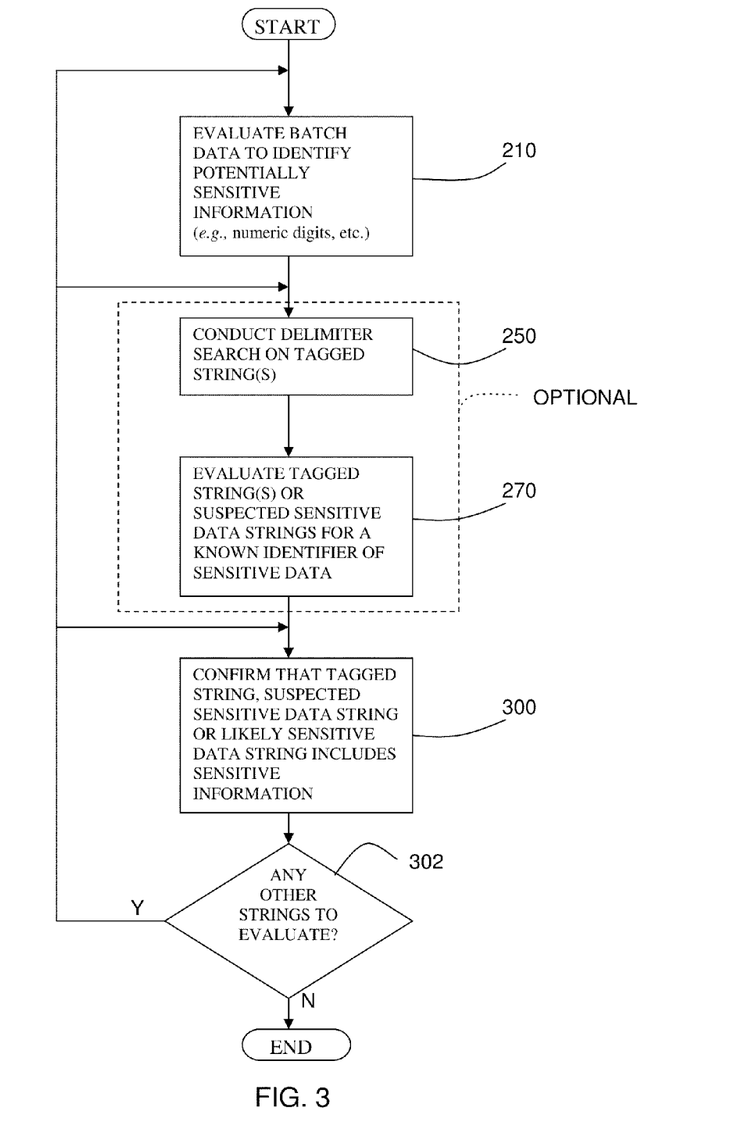
FIG. 3 is a flow chart that illustrates an embodiment of a process by which a group of data is evaluated to determine whether any sensitive information of interest has been stored therein.

In FIG. 3, at reference 210, data 44 stored by memory 42 associated with a merchant's collection system 40 (FIG. 1) is evaluated. Specifically, the data 44 is evaluated to determine whether or not it includes any strings of data that might comprise sensitive information, such as a payment card account number or the like. Without limiting the scope of the present invention, a payment card account number may be thirteen (13) to sixteen (16) digits long. In memory 42, or the data 44, a payment card account number may comprise a number of consecutive bytes (e.g., thirteen (13) to sixteen (16) in UTF-8 encoding, twenty-six (26) to thirty-two (32) in UTF-16 encoding, fifty-two (52) to sixty-four (64) in UTF-32 encoding, etc.) that correspond to thirteen (13) to sixteen (16) numeric digits.

Any suitable technique may be used to identify each string of data within the data 44 (FIG. 1) that includes the appropriate number of consecutive bytes that correspond to thirteen (13) to sixteen (16) numeric digits. One embodiment of such a method includes an "interval scanning" technique, in which a string of data is evaluated in intervals. When such a method is used, bytes of data in periodic sequence (e.g., every thirteenth byte for UTF-8 encoding, two sequential bytes of every twenty-six bytes for UTF-16 encoding, four sequential bytes of every fifty-two bytes for UTF-32 encoding, etc.) are evaluated, while the bytes in between are initially ignored. To enable the search algorithm to identify data of interest across a plurality of formats, or regardless of the particular type of format, in which the data 44 may be encoded (e.g., ASCII/UTF-8, UTF-16LE, UTF-16BE, UTF-32LE, UTF-32BE), a so-called "ordinal" search (e.g., one byte searching for a numeric digit, then two byte searching (both LE and BE) for a numeric digit, then four byte searching (both LE and BE) for a numeric digit, etc.) may be conducted. For the sake of simplicity, the term "byte," as used herein, includes a single byte in UTF-8 encoding, an adjacent pair of bytes in UTF-16 encoding, and an adjacent set of four bytes in UTF-32 encoding.

If the value of the byte corresponds to a decimal numeral (i.e., 0, 1, 2, 3, 4, 5, 6, 7, 8, or 9), that byte is identified as a tagged numeric byte, from which a byte-by-byte analysis, or sequential search, may then commence. In the sequential search, bytes adjacent to both "sides" of the tagged numeric byte may be evaluated to determine whether or not they also correspond to decimal numerals. The sequential search may continue until a determination is made that the number of sequential bytes that correspond to decimal numerals is too short (e.g., <13 digits, etc.) or too long (e.g., >16 digits, etc.) to comprise an account number for a credit card or debit card.

Figure 4:
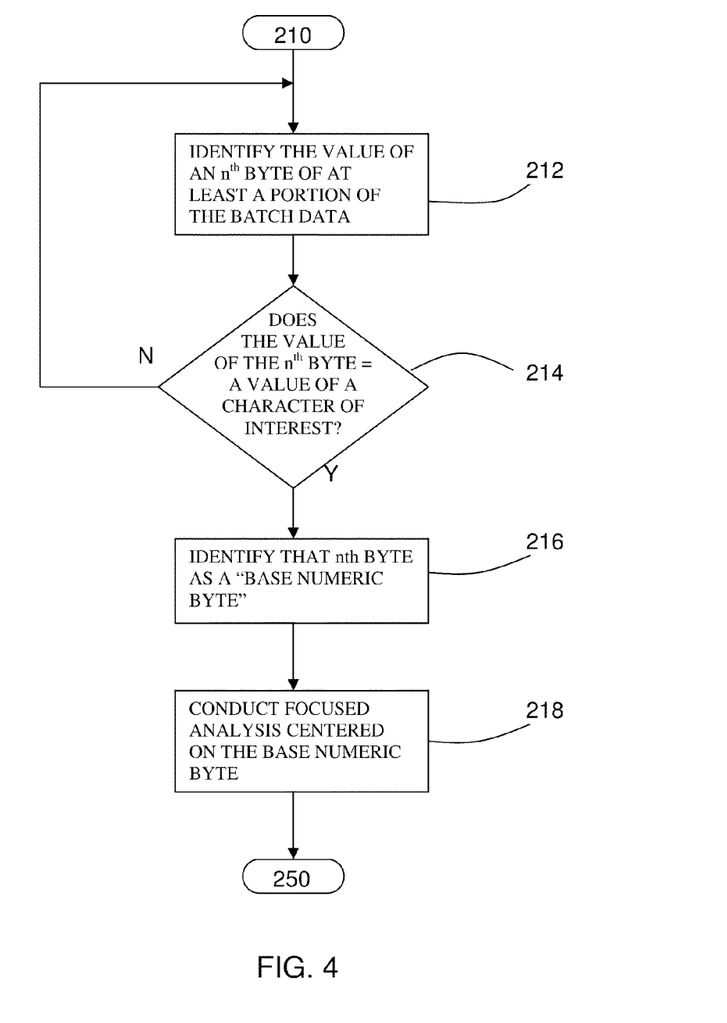
FIG. 4 is a flow chart that shows an embodiment of a focused evaluation that may be conducted when intermittent scanning reveals one or more bytes of interest to determine whether the group of data includes potentially sensitive information and, if so, to tag each string of data that may include the potentially sensitive information.

A specific embodiment of an intermittent scanning technique is illustrated by FIG. 4. When an intermittent scanning technique is used, the evaluation process may be expedited by avoiding a byte-by-byte analysis—all the data 44 (FIG. 1) may be evaluated without analyzing every byte. In some embodiments, all of the data 44 may be evaluated without an individual analysis of most of its bytes. An intermittent scanning process of the present invention may include an initial analysis of every $n^{th}$ byte $B_n$, in sequence, of at least a portion 45 of the data 44, as represented by reference 212 of FIG. 4 and schematically depicted by FIG. 4A.

More specifically, at reference 212, the value of each $n^{th}$ byte $B_n$ of the evaluated portion 45 of the data 44 is determined. In a specific embodiment, which is useful for identifying possible payment card account numbers, the value of every $13^{th}$ byte $B_n$ of the evaluated portion 45 of the data 44 is determined.

At reference 214 of FIG. 4, a determination is made as to whether or not the value of each analyzed byte $B_n$ of the data 44 corresponds to a numeric digit (i.e., 0 through 9, inclusive). If not, process flows back to reference 212, where the next $n^{th}$ byte $B_n$ is analyzed. If the value of an analyzed byte $B_n$ corresponds to a numeric digit, the analyzed byte is identified as a base numeric byte $B_N$ at reference 216. Process then flows to reference 218 of FIG. 4.

Figure 4A:
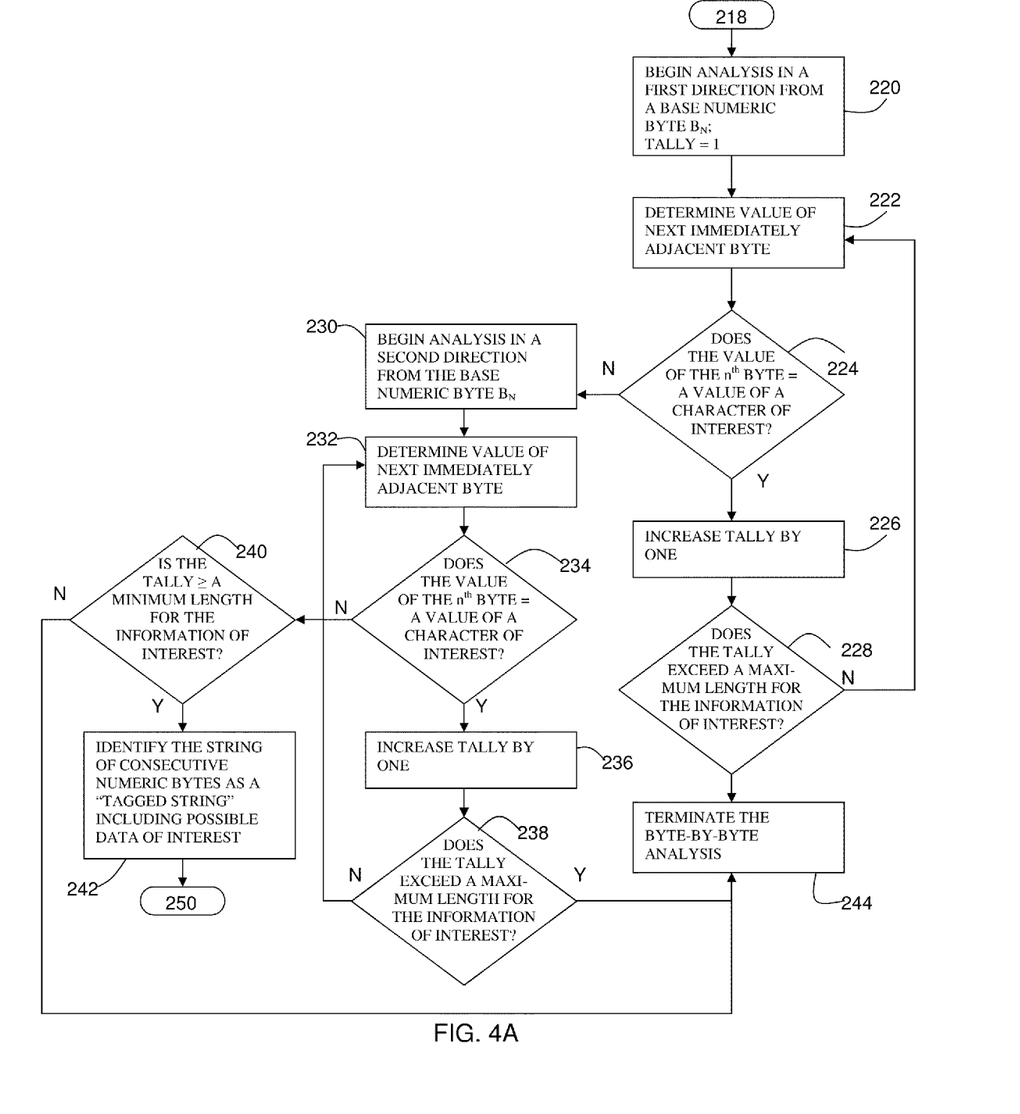
FIG. 4A is a flow chart showing a specific embodiment of the focused evaluation of FIG. 4, in which a byte-by-byte analysis of data adjacent to a byte of interest is conducted.
Figure 4B:
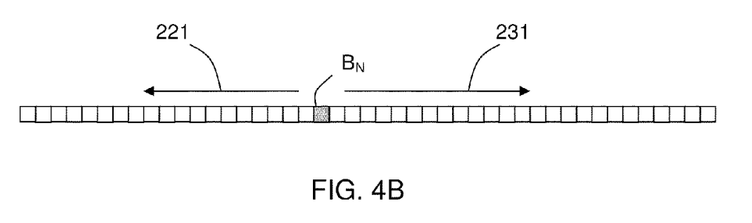
FIG. 4B is a schematic representation of an embodiment of a focused evaluation that initiates at a base byte of interest.

At reference 218 of FIG. 4, a more focused evaluation process is effected. In some embodiments, the more focused evaluation process comprises a byte-by-byte analysis of a portion of the data 44 (FIG. 1) located adjacent to a base numeric byte $B_N$. Again, since the data may be stored in a variety of different UTFs, the searching may be ordinal. An embodiment of such a process is depicted by the flowchart of FIG. 4A and the schematic diagram of FIG. 4B. As shown, the byte-by-byte evaluation process may be initiated from a byte located directly adjacent to the base numeric byte $B_N$ (e.g., at byte $B_{N-1}$, etc.), at reference 220, and progress "linearly" in a first direction 221. The value of that byte (e.g., byte $B_{N-1}$, etc.) is determined at reference 222. If, at reference 224, it is determined that that byte (e.g., byte $B_{N-1}$, etc.) has a value that corresponds to a numeric digit, or comprises a "numeric byte," process flows to reference 226.

At reference 226, a tally of consecutive analyzed bytes, including the identified numeric byte $B_N$, with values that correspond to numeric digits may be kept. The tally may be used to determine whether or not a string of consecutive numeric bytes has a length that corresponds to the length of the information of interest, such as a payment card account number. When the tally increases at reference 226, the tally is compared, at reference 228, to a maximum possible length (e.g., sixteen (16) digits, or bytes, in the case of a payment card account number, etc.) of the information of interest. If a determination is made at reference 228 that the tally exceeds the maximum possible length, the byte-by-byte evaluation for the specific base numeric byte $B_N$ is terminated, at reference 244. If the tally does not exceed the maximum possible length for the information of interest at reference 228, the byte-by-byte evaluation continues on to the next adjacent byte (e.g., byte $B_{N-2}$, etc.). The process then flows back to reference 222, where the next adjacent byte is analyzed.

If the inquiry at reference 224 instead reveals a byte with a value that corresponds to a character that is not a numeric digit, or a "non-numeric byte," the byte-by-byte analysis in the first direction may be terminated and, at reference 230, evaluation may continue on in a second direction 231, from the opposite "side" of the base numeric byte $B_N$ (e.g., at $B_{N+1}$, etc.). Evaluation in the second direction 231 may continue on in sequence, byte-by-byte, at references 232-238, following substantially the same flow as that shown by references 222-228. If a second non-numeric bit is identified at reference 234 before a determination is made at reference 238 that the tally has exceeded the maximum threshold, the tally is evaluated at reference 240 to determine whether the consecutive string of numeric bytes has a length that corresponds to a possible length of the information of interest (e.g., thirteen (13) to sixteen (16) bytes for a payment card account number, etc.). If so, process flows to reference 242, where the string of numeric bytes is identified as a tagged string that comprises possible data of interest, such as a possible payment card account number. If the length of the consecutive string of numeric bytes has a length that is less than the possible length of the information of interest, process flows to reference 244, where the byte-by-byte evaluation for the specific base numeric byte $B_N$ is terminated.

Figure 4C:
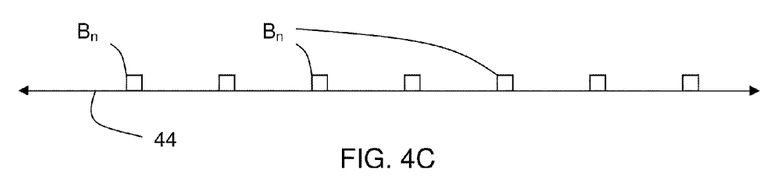
FIGS. 4C and 4D schematically depict different embodiments in which intermittent scanning of data may be conducted to identify potentially sensitive data.

FIG. 4C illustrates a process in which every $n^{th}$ byte is evaluated throughout the entirety of the data 44. In some embodiments, every $n^{th}$ byte of the data 44 may be analyzed, and the locations of base numeric bytes $B_N$ recorded, before process flows any further (e.g., to a byte-by-byte analysis, etc.). Once a focused evaluation has been completed for one base numeric byte (FIGS. 4A and 4B), a focused evaluation may begin for another base numeric byte. Thus, in the depicted embodiment, process flow may return to reference 218 of FIG. 4, where the subsequent focused evaluation is initiated.

In other embodiments, process may flow from intermittent scanning (FIG. 3) to a more focused analysis (FIGS. 4A and 4B) each time a numeric byte $B_N$ is identified. Thus, when a focused analysis has been completed, the process flow may return from reference 242 or 244 of FIG. 4A to reference 250 of FIG. 3.

Figure 4D:
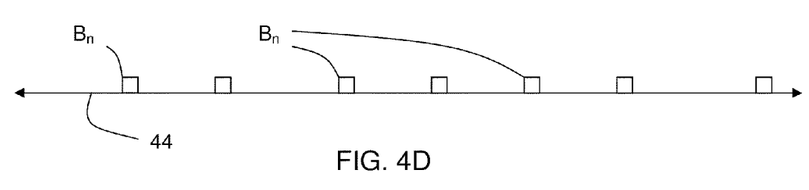

Alternatively, as shown in FIG. 4D, every $n^{th}$ byte of the data 44 may be evaluated until an $n^{th}$ byte $B_n$ with a value that corresponds to a numeric digit (i.e., 0 through 9, inclusive) is identified. Thereafter, intermittent scanning may resume, at reference 250 of FIG. 3, at a location n bytes from the location of last byte analyzed during the preceding byte-by-byte evaluation process.

Once possible data of interest (e.g., a possible payment card account number, etc.), or a tagged string, has been identified from evaluating a larger group of data, in some embodiments, the tagged string that includes possible data of interest may be subjected to further analysis. In some embodiments, further analysis may be conducted immediately after a tagged string of possible data of interest is identified from the larger group of data. In other embodiments, further analysis may not occur until after the larger group of data has been completely evaluated to identify, or tag, all of the strings therein that may comprise possible data of interest.

Any further analysis of the possible data of interest or of a tagged string including the same (e.g., a data string corresponding to thirteen (13) to sixteen (16) consecutive numeric digits, etc.) may provide an increased confidence that the possible data of interest is actual data of interest with relatively low processing requirements, so data strings that have a lower likelihood of comprising actual data of interest are disregarded, or weeded out, before the process flows to a more intensive final analysis (see, e.g., reference 300 of FIG. 3). These "faster" preliminary evaluation processes, or weed-out processes, are intended to identify any "likely data of interest," such as a likely payment card account number.

With returned reference to FIG. 3, at reference 250, an embodiment of a preliminary evaluation process that is referred to herein as a "delimiter search" may be conducted. In a delimiter search, a pair of bytes that surround a tagged string that comprises possible data of interest may be analyzed.

Referring again to FIG. 3, another embodiment of a technique for further evaluating a tagged string or a suspected sensitive data string may be conducted at reference 270. At reference 270, a tagged string or a suspected sensitive data string may be evaluated to determine whether it includes a known identifier of sensitive data. The evaluation of a tagged string or a suspected sensitive data string to detect any known identifiers of sensitive data may be effected in any suitable manner. Such an analysis may be conducted in an ordinal fashion (e.g., one byte searching, then two byte searching (both little endian (LE) and big endian (BE)), then four byte searching (both LE and BE), etc.). In embodiments where the data 44 (FIG. 1) is being evaluated to identify potential account numbers for payment cards, the known identifier may comprise a bank identification number (BIN). As known in the art, BINs include four to six consecutive numeric digits, which typically comprise the first digits in an account number.

A BIN search that incorporates teachings of the present invention may include an analysis of a fixed number of bytes that correspond to digits (e.g., four, six, etc.) of (e.g., at the beginning of, at the end of, in the middle of, scattered throughout, etc.) a potential account number for a payment card. These bytes may be analyzed in a so-called "trie" algorithm, in which a first byte is evaluated at a first node of the "trie." If the value of the first byte does not correspond to a first digit that is known to be present in a BIN, the BIN search may be terminated and the string of data is no longer considered to be a potential account number. If, in the alternative, the value of the first byte is equal to, or matches, a first digit of a known BIN, the search proceeds to a second node of the trie that corresponds to the identified value of the first digit (i.e., a database of a group of second digits that are known to follow the identified first digit in a group of known BINs). Again, if the second analyzed byte does not have a value equal to the second digit of any known BIN that also includes the first digit, the search may be terminated and the string of data may no longer be considered to comprise a potential account number. If the value of the second analyzed byte is equal to the second digit of a known BIN, the process continues to a third node of the trie, where the BIN search continues. If, following conclusion of the BIN search, the values of all of the analyzed bytes match the corresponding digits of a known BIN, the potential account number may be subjected to further analysis.

In instances where a further evaluation process is terminated, process may flow to back to FIG. 3. The part of the process of FIG. 3 to which the process returns may depend upon the manner in which data 44 (FIG. 1) is being evaluated. In embodiments where the evaluation progresses completely in series; i.e., when a tagged string is subjected to further evaluation immediately after the tagged string is identified as including possible data of interest, process may flow back to reference 210 of FIG. 3. At reference 210, the data 44 may be searched for more possible data of interest.

In embodiments where further processing is not conducted until all of the data 44 (FIG. 1) has been evaluated for possible data of interest, and in which all further evaluation of a tagged string is conducted before any further processing is conducted on another tagged string, the evaluation progresses partially in series. When the evaluation progresses partially in series, the process flow may return to reference 250 of FIG. 3, where further evaluation of another tagged string may be initiated.

In embodiments where further evaluation occurs in parallel; i.e., one mode of further evaluation is conducted on all candidates (e.g., tagged strings, suspected sensitive data strings, likely sensitive data strings, etc.) before the next mode of further evaluation is conducted on remaining candidates, the process flow may return to reference 270 of FIG. 3.

Returning reference again to FIG. 3, at reference 300, a tagged string that comprises potentially sensitive data of interest may be subjected to verification. In some embodiments, known processes may be used to determine the likelihood that a string of decimal numerals is an account number for a credit card or debit card. In a specific embodiment, a known validation or "checksum" algorithm, such as the Luhn algorithm, may be used to determine whether or not a potential account number is an actual account number.

Once the evaluation of one data string (e.g., the tagged string, etc.) at reference 300 is complete, the process flow may return to another location on FIG. 3. The location to which the process flow returns (e.g., reference 210, 250, 270, or 300) depends, of course, upon whether the evaluation progresses completely in series, partially in series, or in parallel.

While the above-described systems and processes have been described in terms of searches for potential credit card or debit card account numbers, they are also applicable to searches for other sensitive types of information, including bank account numbers, Social Security numbers, drivers license numbers, and the like.

Although the foregoing description contains many specifics, these should not be construed as limiting the scope of the invention or of any of the appended claims, but merely as providing information pertinent to some specific embodiments that may fall within the scopes of the invention and the appended claims. Features from different embodiments may be employed in combination. In addition, other embodiments of the invention may also be devised which lie within the scopes of the invention and the appended claims. The scope of the invention is, therefore, indicated and limited only by the appended claims and their legal equivalents. All additions, deletions and modifications to the invention, as disclosed herein, that fall within the meaning and scopes of the claims are to be embraced by the claims.

What is claimed:

1. A system for identifying potentially sensitive information, comprising:
    a scanning device configured to communicate with a memory device that stores data including potentially sensitive information, the scanning device programmed to:
        evaluate a plurality of intermittently spaced, evaluated bytes of the data;
        tag each evaluated byte of the plurality of intermittently spaced, evaluated bytes that corresponds to a decimal number to provide a tagged byte;
        enumerate the tagged byte;
        sequentially evaluate and enumerate bytes preceding and following each tagged byte until a value of a preceding sequentially evaluated byte and a value of a following sequentially evaluated byte do not correspond to decimal numbers;
        determine whether a number of sequential enumerated bytes corresponds to a length of a sensitive data string; and
        identify a string of sequential enumerated bytes that falls within the length of the sensitive data string as a suspected sensitive data string.

2. The system of claim 1, wherein the scanning device is programmed to scan every n-th byte of at least a portion of the data.

3. The system of claim 2, wherein n is an integer from four to sixteen.

4. The system of claim 2, wherein n is a possible length of the sensitive data string.

5. The system of claim 1, wherein the scanning device is also programmed to:
    evaluate whether the suspected sensitive data string is immediately preceded by a preceding byte having a value that corresponds to a known delimiter and whether the suspected sensitive data string is immediately followed by a following byte having a value that corresponds to a known delimiter.

6. The system of claim 5, wherein the scanning device is also programmed to:
    evaluate whether bytes of a substring of the suspected sensitive data string collectively correspond to a known identifier of sensitive data.

7. The system of claim 6, wherein the scanning device is also programmed to:
    compare the suspected sensitive data string to a trie to determine a likelihood that the suspected sensitive data string comprises an actual sensitive data string.

8. The system of claim 1, wherein the scanning device is also programmed to:
    evaluate whether bytes of a substring of the suspected sensitive data string collectively correspond to a known identifier of sensitive data.

9. The system of claim 1, wherein the scanning device is also programmed to:
    compare the suspected sensitive data string to a trie to determine a likelihood that the suspected sensitive data string comprises an actual sensitive data string.

10. A system for identifying potentially sensitive information, comprising:
    a memory device in which data including potentially sensitive information is stored; and
    a scanning device in communication with the memory device, the scanning device programmed to:
        evaluate a plurality of intermittently spaced, evaluated bytes of the data;
        tag each evaluated byte of the plurality of intermittently spaced, evaluated bytes that corresponds to a decimal number to provide a tagged byte;
        enumerate the tagged byte;
        sequentially evaluate and enumerate bytes preceding and following each tagged byte until a value of a preceding sequentially evaluated byte and a value of a following sequentially evaluated byte do not correspond to decimal numbers;

determine whether a number of sequential enumerated bytes corresponds to a length of a sensitive data string; and identify a string of sequential enumerated bytes that falls within the length of the sensitive data string as a suspected sensitive data string.

11. The system of claim 10, further comprising:
an administrator that commissions scanning of the memory device.

12. The system of claim 11, wherein the scanning device is also programmed to:
report the suspected sensitive data string to the administrator.

13. The system of claim 10, wherein the scanning device is also programmed to:
evaluate whether the suspected sensitive data string is immediately preceded by a preceding byte having a value that corresponds to a known delimiter and whether the suspected sensitive data string is immediately followed by a following byte having a value that corresponds to a known delimiter.

14. The system of claim 10, wherein the scanning device is also programmed to:
evaluate whether bytes of a substring of the suspected sensitive data string collectively correspond to a known identifier of sensitive data.

15. The system of claim 14, wherein the scanning device is also programmed to:
evaluate whether the bytes of the substring of the suspected sensitive data string collectively correspond to a bank identification number.

16. The system of claim 15, wherein the scanning device is programmed to scan every thirteenth byte of at least a portion of the data.

17. The system of claim 10, wherein the scanning device is also programmed to:
compare the suspected sensitive data string to a trie to determine a likelihood that the suspected sensitive data string comprises an actual sensitive data string.

18. A system for identifying potential payment card numbers, comprising:
a scanning device for evaluating data stored by a memory device under control of a merchant, the data including potential payment card numbers, the scanning device programmed to:
evaluate every thirteenth byte of the data;
tag each thirteenth byte that corresponds to a decimal number to provide a tagged byte;
enumerate the tagged byte;
sequentially evaluate and enumerate bytes preceding and following each tagged byte until a value of a preceding sequentially evaluated byte and a value of a following sequentially evaluated byte do not correspond to decimal numbers;
determine whether a number of sequential enumerated bytes is between thirteen and sixteen bytes, inclusive; and
identify a string of sequential enumerated bytes having a length of thirteen bytes to sixteen bytes as a suspected payment card number.

19. The system of claim 18, wherein the scanning device is also programmed to:
evaluate whether the suspected payment card number is immediately preceded by a preceding byte having a value that corresponds to a known delimiter and whether the suspected payment card number is immediately followed by a following byte having a value that corresponds to a known delimiter.

20. The system of claim 19, wherein the known delimiter includes at least one of a space, a tab, a comma, a forward slash and a backslash.

21. The system of claim 18, wherein the scanning device is also programmed to:
evaluate whether a group of bytes of the suspected payment card number collectively correspond to a known bank identification number.

22. The system of claim 21, wherein the group of bytes of the suspected payment card number comprises a first four bytes, a first five bytes, or a first six bytes of the suspected payment card number.

23. The system of claim 18, wherein the scanning device is also programmed to:
compare the suspected payment card number to a trie to determine a likelihood that the suspected payment card number comprises an actual payment card number.

24. The system of claim 18, further comprising:
the merchant; and
the memory device.

25. The system of claim 24, further comprising:
an administrator that sets a data security standard and commissions scanning of the memory device to determine the merchant's compliance with the data security standard.

26. The system of claim 25, wherein the administrator comprises at least one of an acquirer and an issuer.

27. The system of claim 25, further comprising:
a compliance monitor that operates the scanning device when commissioned by the administrator.

\* \* \* \* \*